United States Patent
Pal et al.

(10) Patent No.: US 11,081,920 B2
(45) Date of Patent: Aug. 3, 2021

(54) ROTOR WEDGES AND LAYERS AND HEAT SINKS

(71) Applicant: Hamilton Sundstrand Corporation, Charlotte, NC (US)

(72) Inventors: Debabrata Pal, Hoffman Estates, IL (US); Ashutosh Joshi, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 840 days.

(21) Appl. No.: 15/721,011

(22) Filed: Sep. 29, 2017

(65) Prior Publication Data
US 2019/0103777 A1    Apr. 4, 2019

(51) Int. Cl.
| H02K 1/32 | (2006.01) |
| H02K 1/28 | (2006.01) |
| H02K 9/22 | (2006.01) |
| H02K 3/52 | (2006.01) |
| H02K 9/00 | (2006.01) |
| H02K 19/16 | (2006.01) |

(52) U.S. Cl.
CPC ............. *H02K 1/32* (2013.01); *H02K 1/28* (2013.01); *H02K 3/527* (2013.01); *H02K 9/00* (2013.01); *H02K 9/22* (2013.01); *H02K 19/16* (2013.01)

(58) Field of Classification Search
CPC ............. H02K 15/0018; H02K 15/022; H02K 15/024; H02K 3/46; H02K 3/48; H02K 3/487; H02K 3/493; H02K 3/527; H02K 1/22; H02K 1/223; H02K 1/26; H02K 1/265; H02K 1/27; H02K 19/00

USPC ..... 310/214, 215, 156.19, 216.082, 216.125, 310/216.126
See application file for complete search history.

(56) References Cited

U.S. PATENT DOCUMENTS

| 1,010,998 | A | * | 12/1911 | Williamson | ............. | H02K 3/51 310/262 |
| 2,015,554 | A | * | 9/1935 | Fisher | ................... | H02K 3/493 310/214 |
| 2,386,673 | A | * | 10/1945 | Fisher | ................... | H02K 3/493 310/214 |
| 2,710,931 | A | * | 6/1955 | Tittel | ..................... | H02K 3/493 428/546 |
| 4,427,910 | A | * | 1/1984 | Richter | ................. | H02K 3/493 310/214 |
| 5,469,009 | A | * | 11/1995 | Wakui | ................... | H02K 1/265 310/179 |

(Continued)

FOREIGN PATENT DOCUMENTS

DE    4121511 A1 *  1/1992  ............. H02K 3/493

OTHER PUBLICATIONS

DE-4121511-A1 English Translation.*

(Continued)

*Primary Examiner* — Maged M Almawri
(74) *Attorney, Agent, or Firm* — Locke Lord LLP; Joshua L. Jones; Scott D. Wofsy

(57) ABSTRACT

A wedge for a wound rotor includes a wedge body. The wedge body has a first layer and one or more second layers interfused with one another to provide structural support and limit resistive heating of the wedge from current flow within the wedge body by windings spaced apart by the rotor wedge. Generator rotors and methods of making generator rotors are also described.

17 Claims, 7 Drawing Sheets

(56) References Cited

U.S. PATENT DOCUMENTS

| | | | | |
|---|---|---|---|---|
| 6,882,079 B2* | 4/2005 | Kilpatrick | .............. | H02K 3/487 |
| | | | | 310/214 |
| 6,967,420 B2* | 11/2005 | Laurent | ................ | H02K 1/2773 |
| | | | | 310/156.51 |
| 6,984,910 B2* | 1/2006 | Down | .................... | H02K 3/527 |
| | | | | 310/192 |
| 8,232,702 B2* | 7/2012 | Zywot | .................... | H02K 3/527 |
| | | | | 310/214 |
| 8,618,710 B2* | 12/2013 | Kimiabeigi | ............ | H02K 3/493 |
| | | | | 310/214 |
| 2004/0232795 A1* | 11/2004 | Tornquist | ............... | H02K 3/527 |
| | | | | 310/214 |
| 2006/0028083 A1* | 2/2006 | Costin | .................... | H02K 1/278 |
| | | | | 310/156.55 |
| 2014/0028145 A1* | 1/2014 | Luise | .................... | H02K 3/493 |
| | | | | 310/214 |
| 2016/0043613 A1 | 2/2016 | Patel et al. | | |
| 2016/0211715 A1* | 7/2016 | Patel | ....................... | H02K 3/527 |
| 2016/0352174 A1 | 12/2016 | Huang et al. | | |
| 2017/0163106 A1 | 6/2017 | Jassal et al. | | |

OTHER PUBLICATIONS

Article in SAE International dated Apr. 14, 2017, Re: Norsk gives Boeing manufacturing edge with first 3D-printed titanium components.

\* cited by examiner

ROTOR WEDGES AND LAYERS AND HEAT SINKS

BACKGROUND OF THE INVENTION

1. Field of the Invention

The present disclosure relates to wound rotors, and more particularly rotor wedges for wound rotors in synchronous machines like generators.

2. Description of Related Art

Synchronous machines with wound rotors, such as motor and generators, are used on aircraft to convert mechanical power to device and generate electrical power. Electric current applied to wound rotor typically generates a magnetic field. In the case of electric motors the rotor magnetic field interacts with a stator magnetic field to generate mechanical power. In the case of electric generators mechanical rotation applied to the rotor rotates the rotor magnetic field relative to the stator to induce a flow of electric current in the stator windings.

Rotors in synchronous machines require structure sufficiently robust to withstand the forces associated with rotation. In some synchronous machines the rotor is constructed with wedges. The wedges are generally seated within the rotor about the rotor periphery and between circumferentially adjacent windings. The wedges are typically constructed of material like aluminum or aluminum alloy. Such rotor wedges constructed of aluminum or aluminum alloy typically provide a strong and lightweight construction that is inexpensive and lightweight. Such rotor wedges readily dissipate heat due to the electrical conductivity of aluminum and aluminum alloys.

Such conventional methods and systems have generally been considered satisfactory for their intended purpose. However, there is still a need in the art for improved rotor wedges, rotor arrangements, and methods of making rotor wedges for wound rotors. The present disclosure provides a solution for this need.

SUMMARY OF THE INVENTION

A wedge for a wound rotor includes a wedge body. The wedge body includes a plurality of layers interfused with one another to provide structural support and limit resistive heating of the wedge from current flow within the wedge body by windings spaced apart by the rotor wedge.

In certain embodiments, the wedge body can include titanium or a titanium alloy. The wedge body can have a longitudinal profile with a generally polygonal or triangular shape, a stator face and an opposed apex, and first and second winding faces. The first and second winding faces can extend on laterally opposite sides of the wedge body and span the apex and the stator face of wedge body.

In accordance with certain embodiments, the wedge body can include one or more cooling channels. The one or more cooling channels can be defined within the stator face of the wedge body. The cooling channels can extend longitudinally along a length of the wedge body. The wedge body can include one or more channel. The channel can extend between longitudinally opposite ends of the wedge body. The channel can be arranged centrally between the apex and the stator face of the wedge body.

In accordance with further embodiments, the channel can be a major channel. The wedge body can include a pair of minor channels. The major channel can be arranged between the apex and the stator face of the wedge body. A first of the minor channels can be arranged between the major channel and the first winding face of the wedge body. A second of the minor channels can be arranged between the major channel and the second winding face of the wedge body.

It is contemplated that, in accordance with certain embodiments, the wedge can include a heat transfer plate. The heat transfer plate can be coupled to stator face of the wedge body. The heat transfer plate can extend along the longitudinal length of the wedge body. The heat transfer plate can include a material with thermal conductivity that is higher than the material forming the wedge body. The heat transfer plate can include aluminum or an aluminum alloy It is also contemplated that, in accordance with certain embodiments, an insulating layer can be deposited over the winding faces and the apex of the wedge body. The insulating layer can extend contiguously between opposite longitudinal ends of the wedge body. The insulating layer can include a polymeric material. A heat sink can be fixed to a longitudinal end of the wedge body. The heat sink can include a finned body. The heat sink can include a material having higher thermal conductivity than the thermal conductivity of the material forming the wedge body. The heat sink can include aluminum or an aluminum alloy.

A wound rotor includes a rotor body, first and second windings, and a wedge as described above. The rotor body is supported for rotation about a rotation axis and has a winding slot. The first and second windings are arranged in the winding slot, the second winding slot being circumferentially offset form the first winding. The wedge is seated the winding with the first winding face abutting the first winding, the second winding face abutting the second winding, and the wedge body electrically separating the first winding from the second winding.

In certain embodiments the second winding can be thermally isolated from the first winding by the wedge body. An insulating layer can be deposited over the first winding face, the second winding face, and the apex. The insulating body can extend continuously between longitudinally opposite ends of the wedge body. The wedge body can include titanium or a titanium alloy.

In accordance with certain embodiments, the wedge body can have a major channel and first and second minor channels. The major and minor channel can extend between longitudinally opposite ends of the wedge body. A heat transfer plate can be coupled to the stator face of the wedge body radially outward of the apex of the wedge body. The heat transfer plate can include a material with thermal conductivity that is higher than thermal conductivity of the material forming wedge body. The heat transfer plate can include aluminum or an aluminum alloy.

A method of making a wedge for a wound rotor includes fusing first and one or more second layers to form a wedge body as described above. Fusing the first and second layers can include fusing a particulate including titanium in an additive manufacturing apparatus. The method can include depositing an insulating layer over the first and second winding faces and the apex of the wedge body. The method can include one or more of (a) coupling a heat transfer plate to the stator face of the wedge body, (b) coupling a heat sink to a first longitudinal end of the wedge body, and (c) coupling a heat sink to a second longitudinal end of the wedge body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
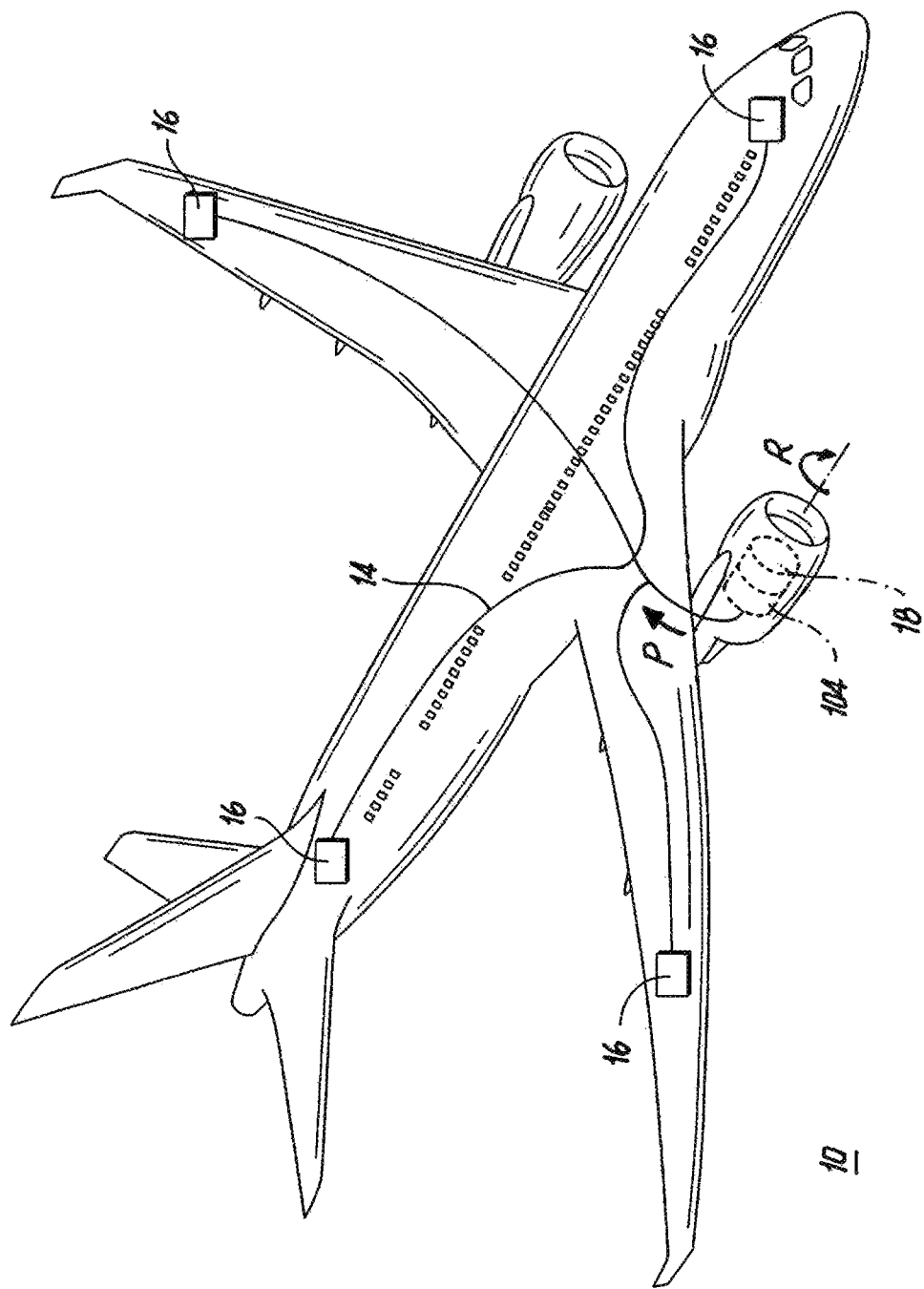
FIG. 1 is a schematic view of an exemplary embodiment of an aircraft electrical system constructed in accordance with the present disclosure, showing a generator with a wound rotor.

Reference will now be made to the drawings wherein like reference numerals identify similar structural features or aspects of the subject disclosure. For purposes of explanation and illustration, and not limitation, a partial view of an exemplary embodiment of a wedge for a wound rotor 100 in accordance with the disclosure is shown in FIG. 2 and is designated generally by reference character 100. Other embodiments of rotor wedges, wound rotors and methods of making rotor wedges in accordance with the disclosure, or aspects thereof, are provided in FIGS. 1 and 3-7, as will be described. The systems and methods described herein can be used wound rotors, such as in generators in aircraft electrical systems, though the present disclosure is not limited to generators or to aircraft electrical systems in general.

Figure 2:
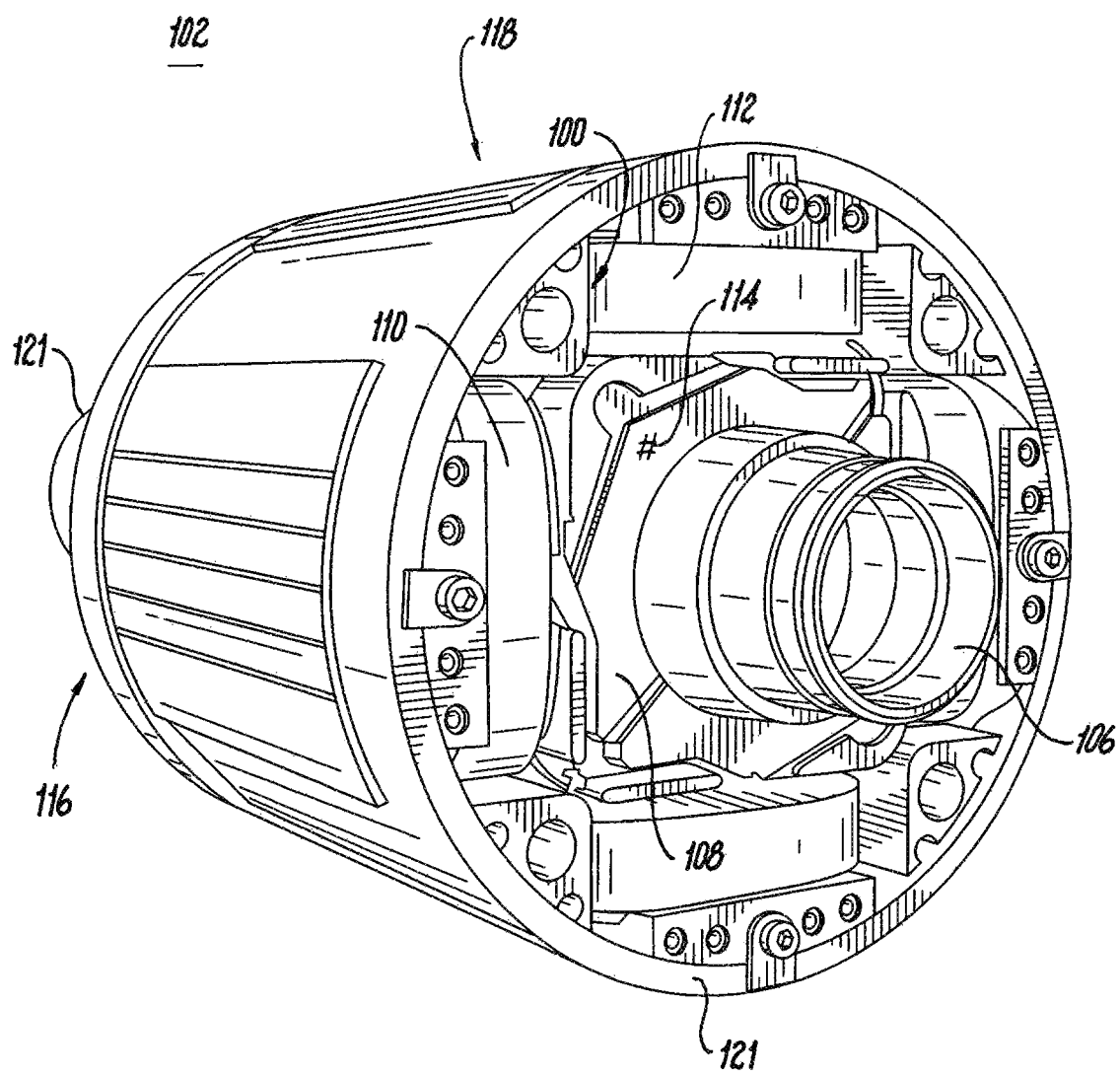
FIG. 2 is perspective view of the wound rotor of FIG. 1, showing a rotor body with rotor wedges and windings arranged about the radial periphery of the rotor body.

Referring to FIG. 1, an aircraft electrical system 10 is shown. Aircraft electrical system 10 includes a generator 104, a power bus 14, and a plurality of power consuming devices 16. An engine 18, e.g., an aircraft main engine or an auxiliary power unit, is operably connected to the generator 12 and arranged to provide mechanical rotation R of a wound rotor 102 (shown in FIG. 2) of generator 12. Generator 12 is electrically connected to the plurality of power consuming devices 16 by power bus 14 and is arranged to provide electrical power P to the plurality of power consuming devices 16 through power bus 14 using mechanical rotation R received from engine 18. It is contemplated that generator 12 be a synchronous machine electrical generator that, in certain embodiments, employs a liquid coolant 405 (shown in FIG. 6) to remove heat from wound rotor 102.

Although described herein as a wound rotor for a generator, it is to be understood and appreciated that other types of electrical machines can also benefit from the present disclosure, such as electric motors and starter/generators by way of non-limiting example.

With reference to FIG. 2, wound rotor 102 is shown. Wound rotor 102 is supported for rotation about a rotation axis 106 and includes a core body 108, a first winding 110, a second winding 112, and rotor wedge 100. Core body 108 is constructed from an electrical steel material 114 and has a radially outer periphery 116 and a plurality of slots 118. Slots 118 are defined within periphery 116 and extend longitudinally along an axial length of core body 108.

First winding 110 and second winding 112 are seated within a common slot 118. Rotor wedge 100 is circumferentially interposed between first winding 110 and second winding 112 to retain first winding 110 and second winding 112 within core body 108 during rotation of wound rotor 102 about rotation axis 106. Collars 121 are arranged at longitudinally opposite ends of core body 108 radially overlap rotor wedge 100. In the illustrated exemplary embodiment wound rotor 100 has four windings and four rotor wedges. As will be appreciated by those of skill in the art in view of the present disclosure wound rotor 102 can have more than four windings or fewer than four windings, as suitable for an intended application. As will also be appreciated by those of skill in the art in view of the present disclosure, wound rotor 102 can have more than four rotor wedges or fewer than four rotor wedges, as suitable for an intended application.

Figure 3:
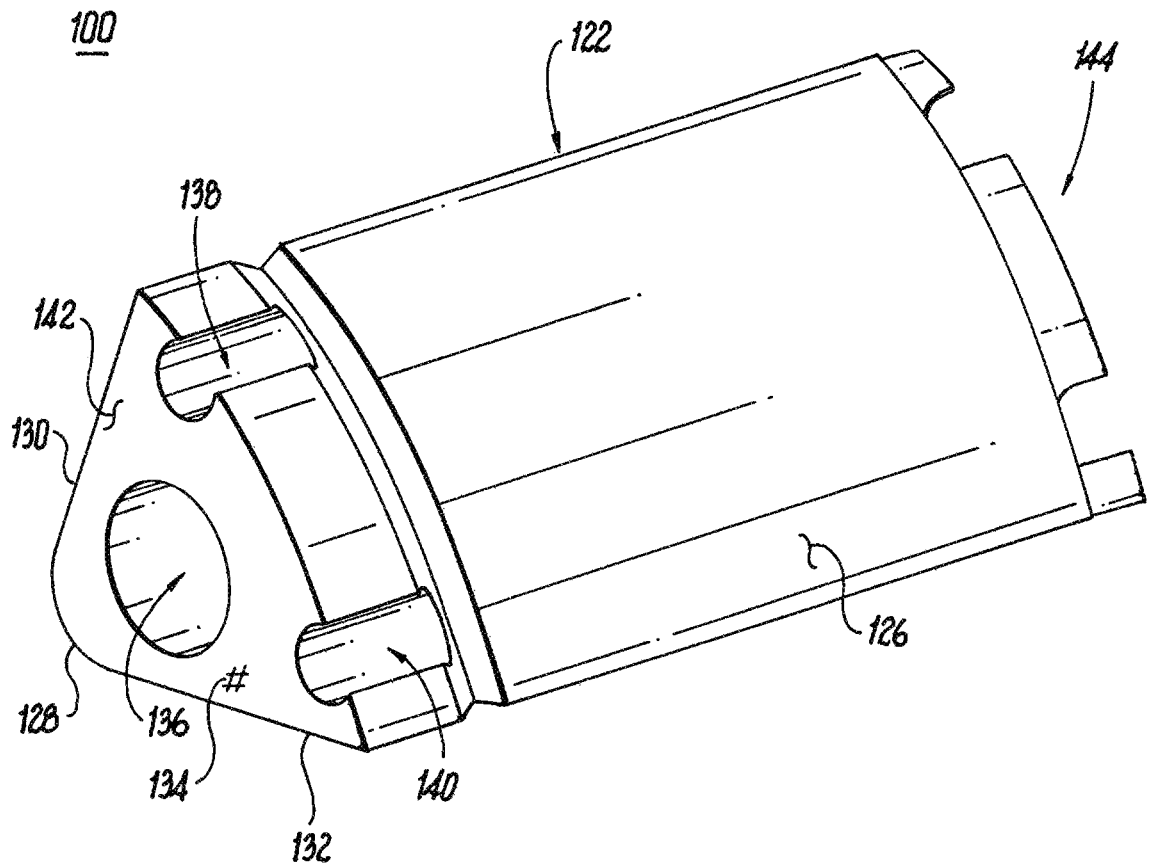
FIG. 3 is a perspective view of the rotor wedge of FIG. 2, showing a wedge body having opposed longitudinal ends and a longitudinal profile.

With reference to FIG. 3, rotor wedge 100 is shown. Rotor wedge 100 has a wedge body 122 a plurality of layers, e.g., a first layer 146 (shown in FIG. 7A) and one or more second layer 148 (shown in FIG. 7A), interfused with one another to provide structural support and limit resistive heating of windings spaced apart by wedge body 122. In the illustrated exemplary embodiment wedge body 122 has a longitudinal profile 124. Longitudinal profile 124 has a generally polygonal shape bounded by a stator face 126, the exemplary polygonal shape illustrated in FIG. 3 being triangular and having an apex 128, a first winding face 130, and a second winding face 132. Stator face 126 has a planar shape or an arcuate shape, as suitable for an intended application.

First winding face 130 and second winding face 132 extend longitudinally on laterally opposite sides of wedge body 122. Apex 128 extends longitudinally along the length of wedge body 122 and bounds first winding face 130 and second winding face 132. It is contemplated that wedge body 122 be constructed from a wedge material 134 that has electrical resistivity higher than that of aluminum such that rotor wedge 100 generates relatively little (or no) heat. In certain embodiments wedge material 134 includes titanium or a titanium alloy, thereby providing a rotor wedge that is strong, light, and does not generate heat from current flow induced by magnetic fields in proximity to rotor wedge 100, e.g., to provide structural support to and limit resistive heating of the wedge caused by current flow within the wedge body by windings spaced apart by the rotor wedge. As will be appreciated by those of skill in the art in view of the present disclosure other polygonal shapes of longitudinal profile are possible within the scope of the present disclosure.

One challenge to fabricating rotor wedges using materials like titanium and titanium alloys is the relatively high cost of titanium to cost using traditional subtractive manufacturing techniques. To overcome this problem wedge body 122 is constructed using an additive manufacturing technique where a plurality of layers, e.g., a first layer 146 (shown in FIG. 7A) and a second layer 148 (shown in FIG. 7A), are fused to one another. An example of a suitable additive manufacturing technique is rapid plasma deposition. Constructing wedge body 122 with a plurality of layers can reduce the cost of wedge body 122. In certain embodiments the cost of manufacturing wedge body 122 from titanium or titanium alloy is on the order of 25% to 50% that of fabricating wedge body 122 using a subtractive manufacturing technique. Use of an additive manufacturing technique also allows for incorporating of features in wedge body 122 that could otherwise be prohibitively expensive using subtractive manufacturing techniques, such as voids and/or hollows within wedge body 122.

For example, in the illustrated exemplary embodiment wedge body 122 has a plurality of channels defined within its interior for reducing the weight of wedge body 122. In this respect wedge body 122 has a major channel 136, a first minor channel 138, and a second minor channel 140. Major channel 136 extends longitudinally along the length of wedge body 122 between a first longitudinal end 142 and a longitudinally opposite second longitudinal end 144. Major channel 136 is arranged radially relative to rotation axis 106 (shown in FIG. 2) between apex 128 and stator face 126.

First minor channel 138 extends longitudinally along the length of wedge body 122 between first longitudinal end 142 and second longitudinal end 144, and is arranged between major channel 136 and first winding face 130. Second minor channel 140 also extends longitudinally along the length of wedge body 122 between first longitudinal end 142 and second longitudinal end 144, and is arranged between major channel 136 and second winding face 132. Although three weight reduction channels are shown in the illustrated exemplary embodiment, those of skill in the art will readily appreciate in view of the present disclosure that wedge body can have fewer than three channels or more than three channels, as suitable for an intended application. As will also be appreciated by those of skill in the art in view of the present disclosure, channels having shapes other than circular can also be defined within wedge body 122, as suitable for an intended application.

Figure 4:
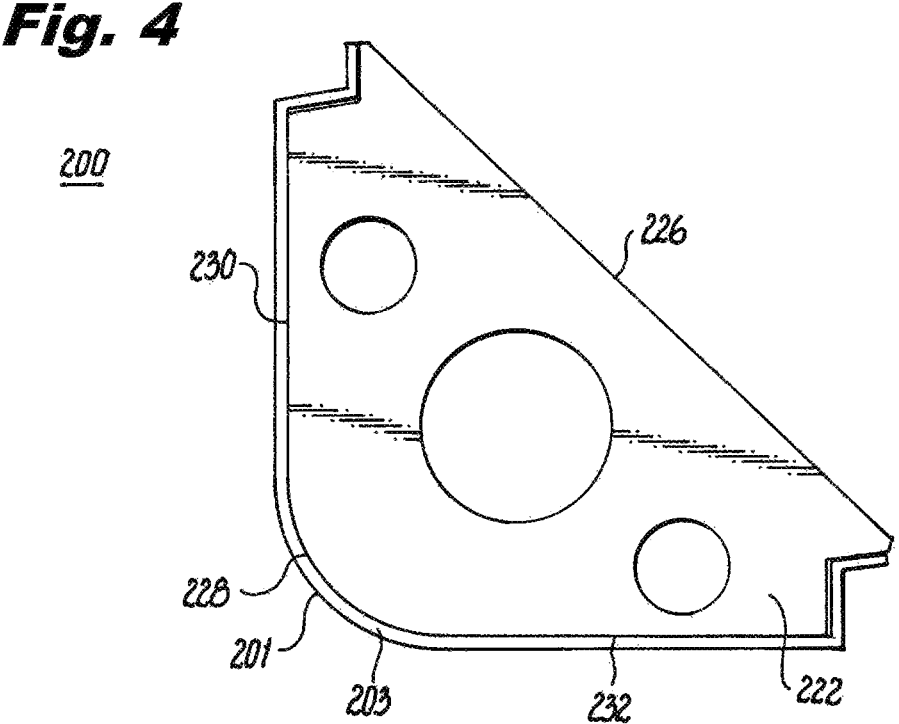
FIG. 4 is a longitudinal end view of the rotor wedge of FIG. 2, showing the longitudinal profile and an insulating layer deposited over winding faces of the wedge body.

With reference to FIG. 4, a rotor wedge 200 is shown. Rotor wedge 200 is similar to rotor wedge 100 (shown in FIG. 2) and additionally includes an insulating layer 201. Insulating layer 201 includes a polymeric material 203 deposited over surfaces of wedge body 222 in abutting first winding 110 (shown in FIG. 2) and second winding 112 (shown in FIG. 2). In the illustrated exemplary embodiment insulating layer 201 is deposited over first winding face 230, apex 228, and second winding face 232 and along the longitudinal length of wedge body 222. Insulating layer 201 is not disposed over stator face 226.

It is contemplated that polymeric material have electrical insulating properties similar to polyimide, e.g., Kapton®, available from the E. I. du Pont de Nemours and Company Corporation of Wilmington, Del. Being deposited on first winding face 130 and second winding face 132, polymeric material 203 eliminates the need to incorporate insulating sheets that otherwise can be required in wound rotors between windings and rotor wedges, simplifying assembly wound rotor 202. Examples of suitable polymeric materials include polyether ether ketone (PEEK), available from Victrex PLC of Lancashire, United Kingdom.

Figure 5:
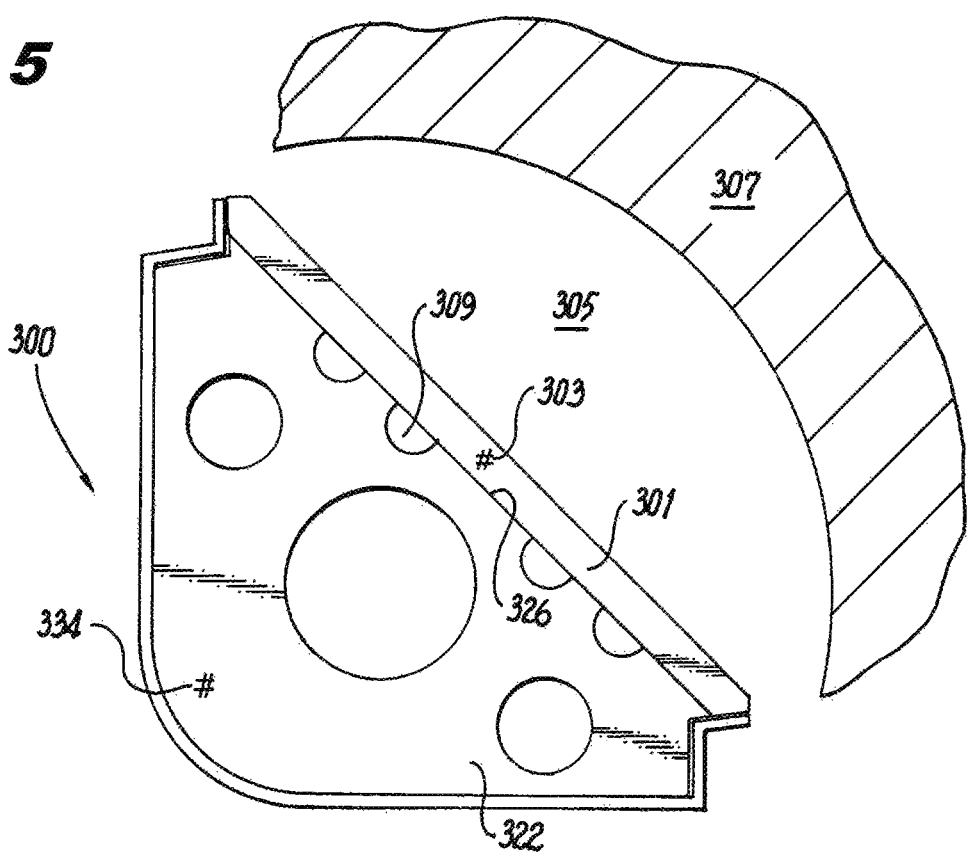
FIG. 5 is a longitudinal end view of the rotor wedge of FIG. 2, showing a coolant conduit defined in rotor wedge stator face and a heat transfer plate coupled to the stator face.

With reference to FIG. 5, a rotor wedge 300 is shown. Rotor wedge 300 is similar to rotor wedge 100 (shown in FIG. 2) and additionally includes a heat transfer plate 301. Heat transfer plate 301 is coupled to stator face 326 of wedge body 322, extends, longitudinally along the length of wedge body 322, and includes a plate material 303. Plate material 303 has thermal conductivity that is higher than the thermal conductivity of wedge material 334. This allows for heat generated an air gap 305 defined between rotor wedge 300 and a stator 307 to transfer into heat transfer plate 301, and therethrough to longitudinally opposite ends of rotor wedge 300 for removal. It is contemplated that plate material 303 have electrical conductivity and/or magnetic permeability that is greater than that of wedge material 334. In certain embodiments plate material 303 includes aluminum or an aluminum alloy. In accordance with certain embodiments wedge material 334 can include titanium or a titanium alloy directly coupled to heat transfer plate 301 at stator face 326.

As also shown in FIG. 5, rotor wedge 300 can have one or more coolant conduit 309 defined within wedge body 322. The one or more coolant conduit 309 is arranged to convey a coolant fluid longitudinally along the length of rotor wedge 300 to remove heat generated by windage across heat transfer plate 301. In the illustrated exemplary embodiment the one or more coolant conduit 309 is defined within stator face 326 and is bounded by heat transfer plate 301 at a radially outer portion of wedge body 322. As will be appreciated by those of skill in the art, arranging the one or more coolant conduit 309 allows for removal of heat from heat transfer plate 301 directly, without the need to communicate the heat through wedge material 334.

Figure 6:
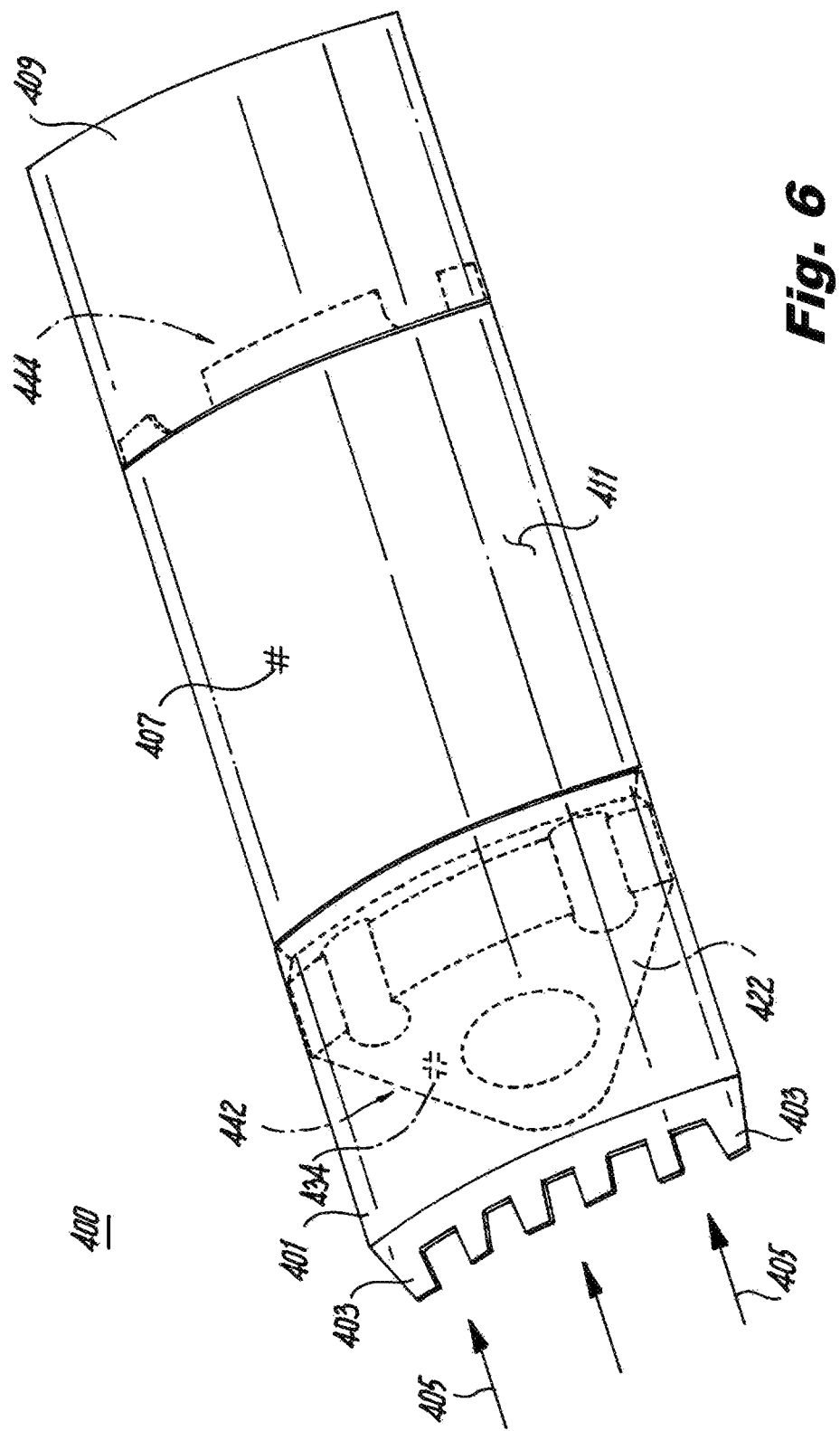
FIG. 6 is a perspective view of the rotor wedge of FIG. 2, showing heat sinks coupled to the rotor wedge at longitudinally opposite ends of the wedge body.

With reference to FIG. 6, a rotor wedge 400 is shown. Rotor wedge 400 is similar to rotor wedge 100 (shown in FIG. 2) and additional includes a heat sink 401. Heat sink 401 has a plurality of fins 403 arranged to receive a coolant flow 405 to transfer heat from rotor wedge 400 and is coupled to first longitudinal end 442. It is contemplated that heat sink 401 be constructed from a heat sink material 407 having thermal conductivity that is higher than the thermal conductivity of wedge material 434 forming wedge body 422. In the illustrated exemplary embodiment heat sink 401 is a first heat sink and rotor wedge 400 includes a second heat sink 409. Second heat sink 409 is coupled to second longitudinal end 444 and on an end of wedge body 422 opposite first heat sink 401. In accordance with certain embodiments, a heat transfer plate 411 can couple first heat sink 401 to second heat sink 409, first heat sink 401 and second heat sink 409 in turn both being coupled to wedge body 422 through heat transfer plate 411.

Figure 7A:
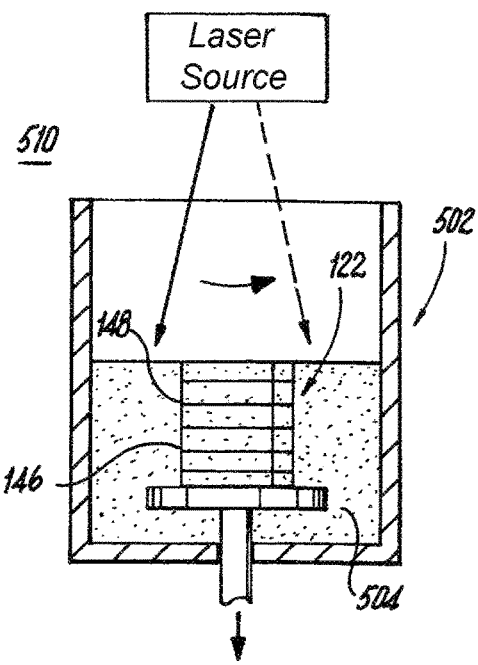
FIGS. 7A-7E show a method of making a wound rotor for a liquid cooled synchronous machine generator, each figure schematically showing an operation of the method.

Referring now to FIGS. 7A-7E, a method of making a rotor wedge for wound rotor is shown. As shown in FIG. 7A, method includes fusing 510 a first layer 146 to a second layer 148 to form wedge body 122. It is contemplated that first layer 146 be proximate to first longitudinal end 142, second layer 148 be proximate to second longitudinal end 144 and arranged on a side of first layer 146 opposite first longitudinal end 142, and that successive layers thereafter be fused to second layer 148. Via an additive manufacturing technique, wedge body 122 is constructed layerwise in the longitudinal direction. Each layer can include titanium or titanium alloy 504 fused using an additive manufacturing technique. Examples of suitable additive manufacturing techniques include rapid plasma deposition (RPD) process tool 502. Exemplary RPD processes include those employing RPD process tools such as the MERKE IV RPD workstation, available from Norsk Titanium AS of Honèfoss, Norway.

Figure 7B:
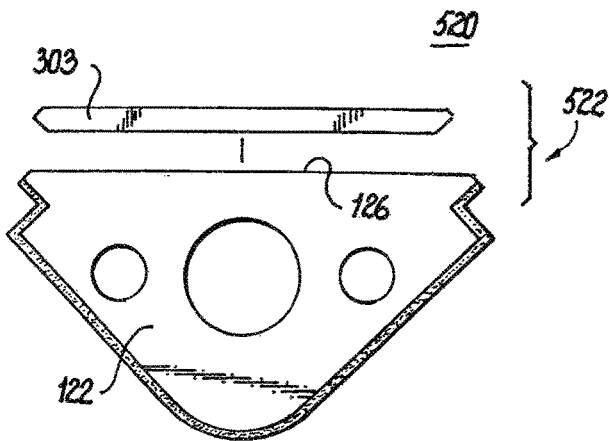

Once wedge body 122 is formed heat transfer plate 303 can be coupled to stator face 126 of wedge body 122 in a coupling operation 520, as shown in FIG. 7B. Coupling can be accomplished, for example, utilizing a friction stir welding operation 522 coupling the aluminum forming heat transfer plate 303 to the titanium forming wedge body 122. Although a friction stir welding operation is shown it is to be understood and appreciated that other welding techniques may also be employed.

Figure 7C:
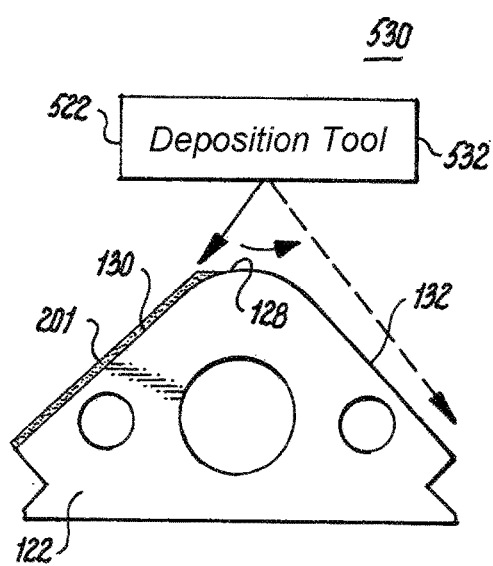

Insulating layer 201 is then deposited in a deposition operation 530 over wedge body 122, as shown in FIG. 7C. Deposition of insulating layer 201 can be through a VICOTE™ deposition process tool 532 such as those available from Victrex PLC of Lancashire, United Kingdom. It is contemplated that insulating layer be deposited over first winding face 130, second winding face 132, and apex 128 of wedge body 122. As will be appreciated by those of skill in the art in view of the present disclosure, performing deposition operation 530 subsequent to coupling operation 520 prevents the heat associated with welding operation 522 from disturbing insulating layer 201.

Figure 7D:
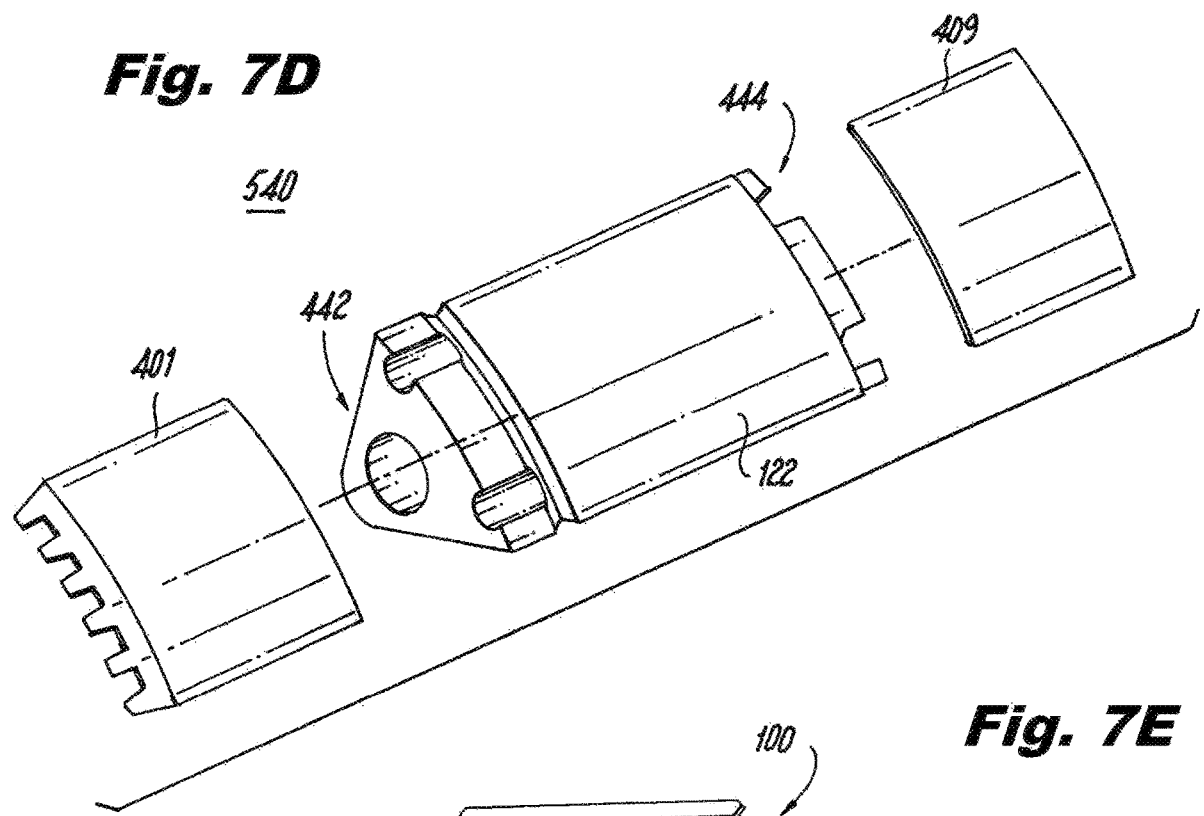
Figure 7E:
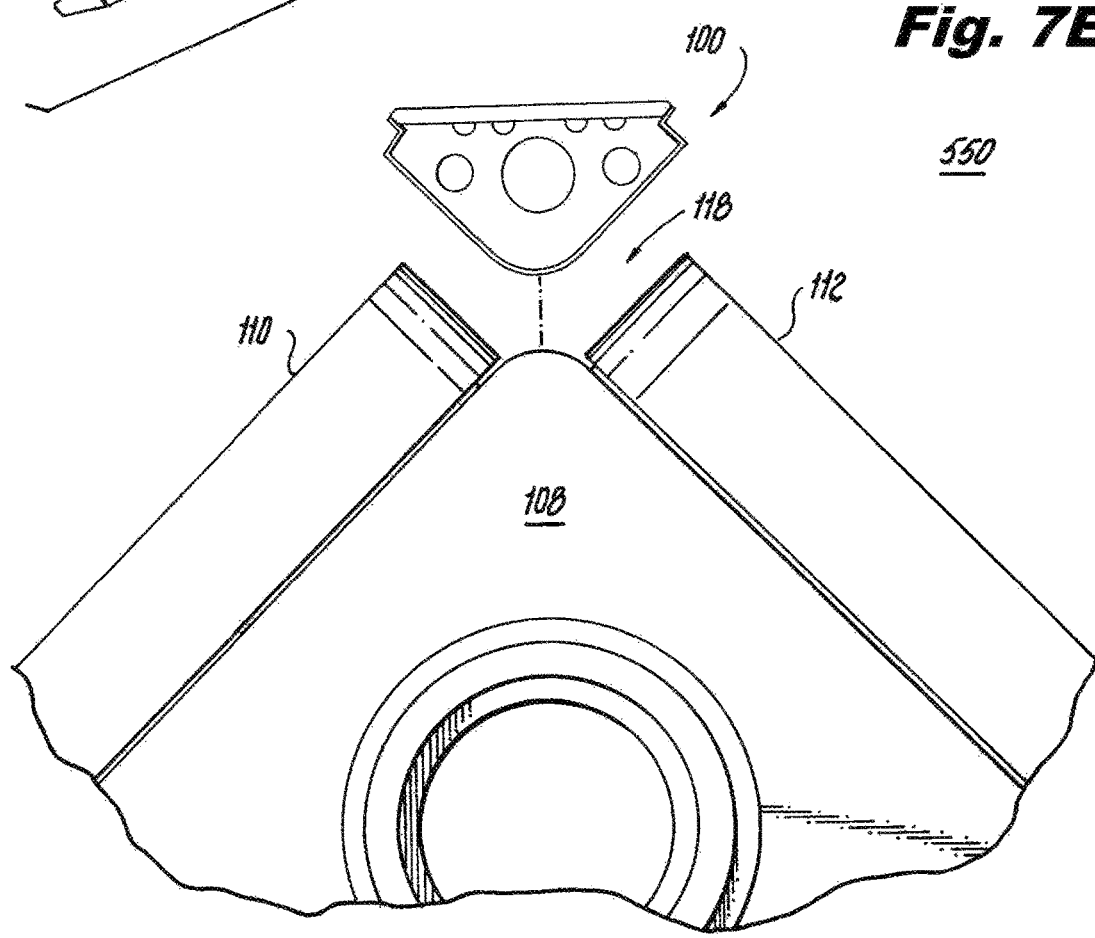

First heat sink 401 and second heat sink 409 can be coupled to longitudinally opposite first end 442 and second end 444 in a heat sink assembly operation 540 as shown in FIG. 7D. Heat sink operation 540 can occur prior to deposition operation 530 or after deposition operation 530, as operationally suitable. Once assembly of rotor wedge 100 is complete rotor wedge 100 can be seated in core body 108 within common slot 118 and between first winding 110 and second winding 112 in a wound rotor assembly operation 550, as shown in FIG. 7E.

The methods and systems of the present disclosure, as described above and shown in the drawings, provide for rotor wedges with superior properties including good structural strength, relatively low heat generation, and good heat transfer capability for removing heat generated from windage losses. In certain embodiments, wedges described herein have integrated heat conduction structures, simplifying assembly of generator rotors employing the wedges. In accordance with certain embodiments, wedges described herein have integrated insulation, simplifying assembly of generator rotors employing the wedges. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A rotor wedge for a wound rotor, comprising:
a wedge body having a plurality of layers interfused with one another to provide structural support and limit resistive heating of the wedge caused by current flow within the wedge body by windings spaced apart by the rotor wedge, the rotor wedge further comprising an insulating layer deposited over first and second winding faces and an apex of the wedge body, wherein the insulating layer extends contiguously between opposite longitudinal ends of the wedge body, wherein the apex is between the two winding faces on a radially inner side of the wedge body.

2. The rotor wedge as recited in claim 1, wherein the wedge body comprises titanium or titanium alloy.

3. The rotor wedge as recited in claim 1, wherein the wedge body has at least one channel extending between longitudinally opposite ends of the wedge body.

4. The rotor wedge as recited in claim 1, wherein the insulating layer comprises a polymeric material.

5. The rotor wedge as recited in claim 1, further comprising a heat sink fixed to a longitudinal end of the wedge body, wherein the fins face inward.

6. The wedge as recited in claim 5, wherein the heat sink includes a material having higher thermal conductivity than a material forming the wedge body.

7. The rotor wedge as recited in claim 5, wherein the heat sink includes aluminum or aluminum alloy.

8. The rotor wedge as recited in claim 5, wherein the heat sink includes a finned body longitudinally spaced apart from the wedge body.

9. The rotor wedge as recited in claim 1, wherein the wedge body has a longitudinal profile, the longitudinal profile having a generally polygonal or triangular shape with a stator face, an apex opposite the stator face, and first and second winding faces spanning the apex and the stator face on laterally opposite sides of wedge body.

10. The rotor wedge as recited in claim 9, wherein the wedge body has a major channel and a pair of minor channels, the major channel arranged laterally between the apex and the stator face of the wedge body, a first of the minor channels arranged laterally between the major channel and the first winding face, a second of the minor channels arranged laterally between the major channel and the second winding face of the wedge body.

11. The rotor wedge body as recited in claim 9, wherein the wedge body includes one or more cooling channels defined within the stator face and extending longitudinally along the wedge body.

12. The rotor wedge as recited in claim 9, further comprising a heat transfer plate coupled to stator face of the wedge body and extending along a longitudinal length of the wedge body.

13. The rotor wedge as recited in claim 12, wherein the heat transfer plate includes a material having higher thermal conductivity than a material forming the wedge body, wherein the heat transfer plate is on a radially outward stator face of the wedge body.

14. The rotor wedge as recited in claim 12, wherein the heat transfer plate includes aluminum or an aluminum alloy.

15. A wound rotor for a synchronous machine generator, comprising:
a rotor body supported for rotation along a rotation axis and having a winding slot;
first and second windings seated in the winding slot, the second winding offset circumferentially from the first winding; and;
a rotor wedge seated in winding slot between the first winding and the second winding, the first winding abutting a first winding face of the wedge body, the second winding abutting a second winding face of the wedge body arranged of a circumferentially opposite the first winding face, and the wedge body electrically isolating the first winding from the second winding, the rotor wedge further comprising an insulating layer deposited over first and second winding faces and an apex of the wedge body, wherein the insulating layer extends contiguously between opposite longitudinal ends of the wedge body, wherein the apex is between the two winding faces on a radially inner side of the wedge body.

16. The wound rotor as recited in claim 15, wherein the second winding is electrically isolated from the first winding by the wedge body and further comprising an insulating layer, wherein the insulating layer is deposited over the winding faces and the apex of the wedge body, wherein the insulating layer extends contiguously between opposite longitudinal end of the stator face of the wedge body.

17. The wound rotor as recited in claim 15, wherein the wedge body comprises titanium or a titanium alloy, wherein the wedge body has at least one channel extending between longitudinally opposite ends of the wedge body, and further comprising a heat transfer plate coupled to the stator face of the wedge body and extending longitudinally along at least a portion of the wedge body, wherein the heat transfer plate comprises aluminum or an aluminum alloy.

\* \* \* \* \*